US008705444B2

(12) United States Patent
Pan et al.

(10) Patent No.: US 8,705,444 B2
(45) Date of Patent: *Apr. 22, 2014

(54) WIRELESS COMMUNICATION METHOD AND APPARATUS FOR DECODING ENHANCED DEDICATED CHANNEL ABSOLUTE GRANT CHANNEL TRANSMISSIONS

(75) Inventors: Kyle Jung-Lin Pan, Smithtown, PA (US); Sung-Hyuk Shin, Northvale, NJ (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1023 days.

This patent is subject to a terminal disclaimer.

(21) Appl. No.: 12/712,252

(22) Filed: Feb. 25, 2010

(65) Prior Publication Data

US 2010/0150078 A1  Jun. 17, 2010

Related U.S. Application Data

(63) Continuation of application No. 11/478,395, filed on Jun. 28, 2006, now Pat. No. 7,688,796.

(60) Provisional application No. 60/713,140, filed on Aug. 31, 2005.

(51) Int. Cl.
*H04W 4/00* (2009.01)
*H04B 7/216* (2006.01)
*H04H 20/71* (2008.01)

(52) U.S. Cl.
USPC ............ 370/328; 370/342; 370/335; 370/312

(58) Field of Classification Search
USPC ......................................... 370/328
See application file for complete search history.

(56) References Cited

U.S. PATENT DOCUMENTS

| 5,883,923 | A | 3/1999 | Shimazaki |
|---|---|---|---|
| 2002/0170013 | A1 | 11/2002 | Bolourchi |
| 2005/0286654 | A1 | 12/2005 | Tanrikulu et al. |

(Continued)

FOREIGN PATENT DOCUMENTS

| EP | 1487145 | 12/2004 |
|---|---|---|
| WO | 03/015320 | 2/2003 |
| WO | 03/049308 | 6/2003 |
| WO | 03049308 | 6/2003 |

OTHER PUBLICATIONS

Third Generation Partnership Project, "Technical Specification Group Radio Access Network; Medium Access Control (MAC) protocol specification (Release 6)," 3GPP TS 25.321 V6.9.0 (Jun. 2006).

(Continued)

*Primary Examiner* — Noel Beharry
(74) *Attorney, Agent, or Firm* — Volpe and Koenig, P.C.

(57) ABSTRACT

A method of decoding enhanced uplink absolute grant channel (E-AGCH) transmissions in a wireless transmit/receive unit (WTRU). E-AGCH data is received, the E-AGCH data including a cyclic redundancy check (CRC) part and a data part, the CRC part having been masked with a WTRU identity (ID). The CRC part and the data part are demultiplexed and the CRC part is demasked with a first WTRU ID. A first CRC is performed with the data part and the CRC part demasked with the first WTRU ID. The data part is decoded on a condition that the first CRC passes.

15 Claims, 3 Drawing Sheets

(56) References Cited

U.S. PATENT DOCUMENTS

| | | |
|---|---|---|
| 2006/0114877 A1 | 6/2006 | Heo et al. |
| 2006/0156184 A1 | 7/2006 | Kim et al. |
| 2008/0253300 A1* | 10/2008 | Wakabayashi et al. ....... 370/252 |
| 2009/0036139 A1 | 2/2009 | Usuda et al. |

OTHER PUBLICATIONS

Third Generation Partnership Project, "Technical Specification Group Radio Access Network; Medium Access Control (MAC) protocol specification (Release 5)," 3GPP TS 25.321 V5.12.0 (Sep. 2005).

Third Generation Partnership Project, "Technical Specification Group Radio Access Network; Medium Access Control (MAC) protocol specification (Release 6)," 3GPP TS 25.321 V6.5.0 (Jun. 2005).

Third Generation Partnership Project, "Technical Specification Group Radio Access Network; Medium Access Control (MAC) protocol specification (Release 5)," 3GPP TS 25.321 V5.11.0 (Jun. 2005).

ETSI, Universal Mobile Telecommunications System (UMTS); Multiplexing and Channel Coding (FDD) (3GPP TS 25.212 version 6.4.0 Release 6), ETSI TS 125 212 V6.4.0, (Mar. 2005).

ETSI, Universal Mobile Telecommunications System (UMTS); Multiplexing and Channel Coding (FDD) (3GPP TS 25.212 version 6.7.0 Release 6), ETSI TS 125 212 V6.7.0, (Dec. 2005).

3$^{rd}$ Generation Partnership Project; Technical Specification group Radio Access Network; FDD Enhanced Uplink; Physical Layer Aspects (Release 6); 3GPP TR 25.808 V6.0.0 (Mar. 2005).

ETSI, Universal Mobile Telecommunications System (UMTS); Radio Resource Control (RRC) protocol specification; (3GPP TS 25.331 version 6.6.0 Release 6); ETSI TS 125 331 V6.6.0 (Jun. 2005).

ETSI, Universal Mobile Telecommunications System (UMTS); Radio Resource Control (RRC); Protocol specification (3GPP TS 25.331 version 6.10.0 Release 6); ETSI TS 125 331 V6.10.0 (Jun. 2006).

Third Generation Partnership Project, "Technical Specification Group Radio Access Network; FDD Enhanced Uplink; Overall description; Stage 2 (Release 6)," 3GPP TS 25.309 V6.3.0 (Jun. 2005).

Third Generation Partnership Project, "Technical Specification Group Radio Access Network; FDD Enhanced Uplink; Overall description; Stage 2 (Release 6)," 3GPP TS 25.309 V6.6.0 (May 2006).

Mahtab et al., "CDMA Based Wireless Transceiver System Matlab Simulation and FPGA Implementation," Engineering Sciences and Technology (Aug. 27, 2005).

Third Generation Partnership Project, "Technical Specification Group Radio Access Network; FDD Enhanced Uplink; Physical Layer Aspects (Release 6)," 3GPP TR 25.808 V2.0.0 (Mar. 2005).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.7.0 (Jun. 2005).

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).

Third Generation Partnership Project, "Technical Specification Group Radio Access Network; Physical channels and mapping of transport channels onto physical channels (FDD) (Release 6)," 3GPP TS 25.211 V6.5.0 (Jun. 2005).

Third Generation Partnership Project, "Technical Specification Group Radio Access Network; Physical channels and mapping of transport channels onto physical channels (FDD) (Release 6)," 3GPP TS 25.211 V6.7.0 (Dec. 2005).

Third Generation Partnership Project, "Technical Specification Group Radio Access Network; Physical channels and mapping of transport channels onto physical channels (FDD) (Release 7)," 3GPP TS 25.211 V7.0.0 (Mar. 2006).

* cited by examiner

WIRELESS COMMUNICATION METHOD AND APPARATUS FOR DECODING ENHANCED DEDICATED CHANNEL ABSOLUTE GRANT CHANNEL TRANSMISSIONS

CROSS REFERENCES TO RELATED APPLICATIONS

This application is a continuation of U.S. patent application Ser. No. 11/478,395, filed Jun. 28, 2006, now U.S. Pat. No. 7,688,796, issued Mar. 30, 2010, which claims the benefit of U.S. Provisional Patent Application No. 60/713,140, filed Aug. 31, 2005, which are incorporated by reference as if fully set forth herein.

FIELD OF INVENTION

The present invention is related to wireless communications.

BACKGROUND

Enhanced uplink (EU) is one of the major features in third generation partnership project (3GPP) frequency division duplex (FDD) systems. EU offers a peak data rate of 5.76 Mbps. Several downlink physical channels are provided to support EU transmissions. One of the downlink channels is the E-AGCH.

FIG. 1 is a block diagram of a conventional wireless communication system 100 which supports EU. The system 100 includes a WTRU 102, a Node-B 104 and a radio network controller (RNC) 106. The RNC 106 controls overall E-DCH operation by configuring E-DCH parameters for the Node-B 104 and the WTRU 102, such as an initial transmit power level, maximum allowed transmit power or available channel resources per Node-B. Between the WTRU 102 and the Node-B 104, an E-DCH 108, an E-DCH dedicated physical control channel (E-DPCCH) 110, an E-AGCH 112, an E-DCH relative grant channel (E-RGCH) 114 and an E-DCH hybrid automatic repeat request (H-ARQ) indicator channel (E-HICH) 116 are established for supporting E-DCH operations.

For E-DCH transmissions, the WTRU 102 sends scheduling requests (also known as rate requests) for the logical channels which a radio resource control (RRC) determines that reporting is needed to be made to the Node-B 104 via the E-DCH 108. The scheduling requests are transmitted in the form of scheduling information and happy bit. The happy bit is transmitted via the E-DPCCH 110 whenever the E-DPCCH 110 is transmitted. The Node-B 104 sends a scheduling grant to the WTRU 102 via the E-AGCH 112 or the E-RGCH 114. After E-DCH radio resources are allocated for the WTRU 102, the WTRU 102 transmits data via the E-DCH 108. In response to the E-DCH transmissions, the Node-B 104 sends an acknowledgement (ACK) or a non-acknowledgement (NACK) message for H-ARQ operation via the E-HICH 116.

The E-AGCH 112 is a very important channel for performing fast scheduling in the EU. The E-AGCH 112 carries the scheduling grant in the form of a maximum power ratio for the WTRU 102. The maximum power ratio is given by the power ratio of the E-DCH dedicated physical data channel (E-DPDCH) over the dedicated physical control channel (DPCCH) (not shown in FIG. 1). In addition, the E-AGCH 112 also carries an activation flag that is used to activate or deactivate H-ARQ processes, indicating activation or deactivation of either single or all H-ARQ processes.

The E-AGCH 112 is transmitted with an E-DCH radio network temporary identifier (E-RNTI). Under the current 3GPP standards, two E-RNTIs may be configured for the WTRU 102 at a time. One is a primary E-RNTI and the other is a secondary E-RNTI. Only one E-RNTI may be transmitted at a time. The WTRU 102 should monitor both E-RNTIs if configured. Decoding of the E-AGCH 112 has to be performed for both E-RNTIs if configured. The success or failure of the decoding of the E-AGCH 112 significantly affects the performance of the EU. Therefore, it is desirable to provide a reliable method for decoding the E-AGCH 112.

SUMMARY

A method of decoding enhanced uplink absolute grant channel (E-AGCH) transmissions in a wireless transmit/receive unit (WTRU). E-AGCH data is received, the E-AGCH data including a cyclic redundancy check (CRC) part and a data part, the CRC part having been masked with a WTRU identity (ID). The CRC part and the data part are demultiplexed and the CRC part is demasked with a first WTRU ID. A first CRC is performed with the data part and the CRC part demasked with the first WTRU ID. The data part is decoded on a condition that the first CRC passes.

BRIEF DESCRIPTION OF THE DRAWINGS

A more detailed understanding of the invention may be had from the following description, given by way of example and to be understood in conjunction with the accompanying drawings, wherein.

DETAILED DESCRIPTION

When referred to hereafter, the term "WTRU" includes, but is not limited to, a user equipment (UE), a mobile station, a fixed or mobile subscriber unit, a pager, or any other type of device capable of operating in a wireless environment. When referred to hereafter, the term "Node-B" includes, but is not limited to, a base station, a site controller, an access point or any other type of interfacing device in a wireless environment.

The features of the present invention may be incorporated into an integrated circuit (IC) or be configured in a circuit comprising a multitude of interconnecting components. The present invention may be implemented in the form of an application specific integrated circuit (ASIC) and/or digital signal processing (DSP), as software or hardware.

Figure 1:
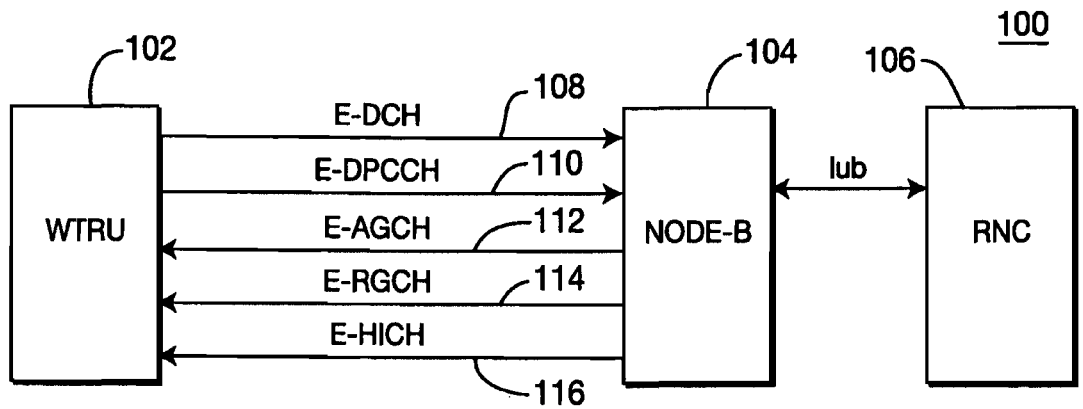
FIG. 1 is a block diagram of a conventional wireless communication system.
Figure 2:
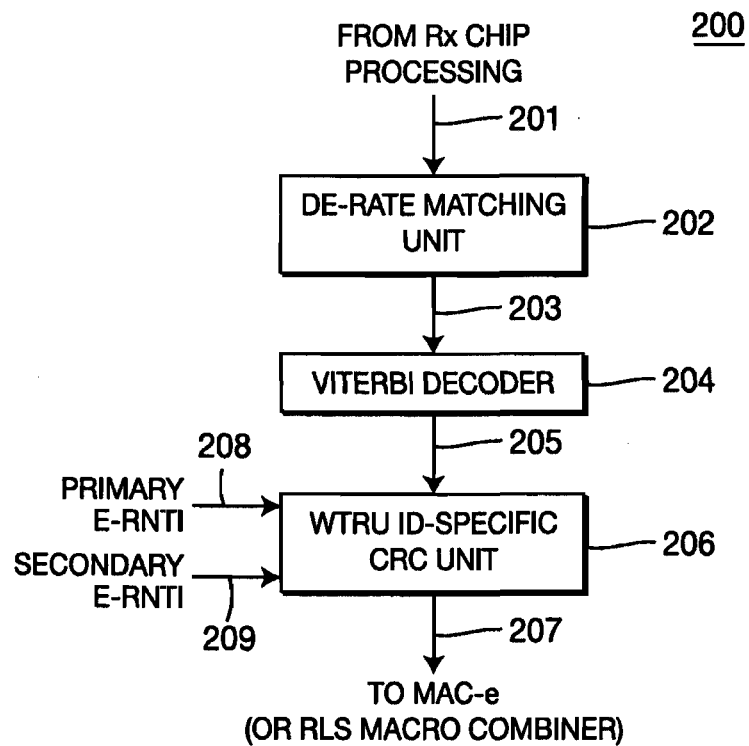
FIG. 2 is a block diagram of a decoding chain of a WTRU for decoding an E-AGCH after receive chip rate processing is performed.

FIG. 2 is a block diagram of a decoding chain 200 of a WTRU for decoding an E-AGCH after receive chip rate processing is performed. The decoding chain 200 includes a de-rate matching unit 202, a Viterbi decoder 204 and a WTRU ID-specific CRC unit 206. An input sequence 201 recovered by a receive chip rate processor (not shown) is sent to the de-rate matching unit 202. The input sequence 201 is a sequence of soft bits in an E-AGCH subframe obtained after a receive chip rate processing is performed. The decoding chain 200 operates on a subframe basis (i.e., 2 ms).

The de-rate matching unit 202 performs de-rate matching on the input sequence 201 to obtain a de-rate matched sequence 203. The de-rate matching is an inverse process of the rate matching process which is performed in a Node-B. The de-rate matched sequence 203 is sent to the Viterbi decoder 204 for convolutional decoding, resulting in a bit sequence 205. The bit sequence 205 is sent to the WTRU ID-specific CRC unit 206 for performing CRC(s).

The bit sequence 205 includes a data part (i.e., the absolute grant information) and a CRC part. At the Node-B, a 16-bit CRC is attached to the data part and the CRC is masked with one of the two WTRU IDs (i.e., a primary E-RNTI 208 or a secondary E-RNTI 209). The masking is performed by a modular-2 addition of the CRC part and the WTRU ID. The WTRU does not know which ID has been used to mask the CRC part. Therefore, the WTRU ID-specific CRC unit 206 performs a CRC with either the primary E-RNTI 208 or the secondary E-RNTI 209 for each received E-AGCH transmission. If the CRC passes, the data part is sent to a MAC-e entity (not shown) or to a radio link set (RLS) macro combiner for macro combining. If the CRC fails, the data part may be discarded or stored in a memory to be combined with a subsequent transmission.

Figure 3:
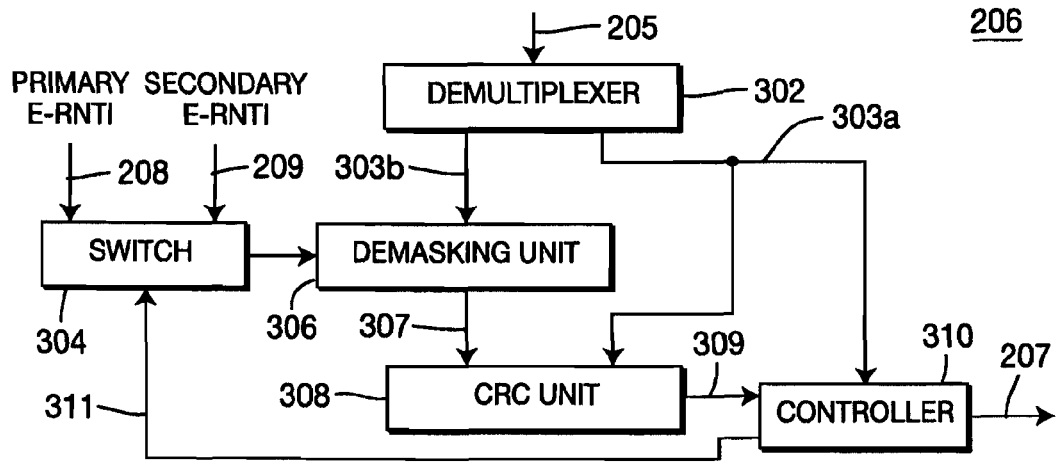
FIG. 3 is a block diagram of a WTRU ID-specific CRC unit in the decoding chain of FIG. 2.

FIG. 3 is a block diagram of the WTRU ID-specific CRC unit 206 of the decoding chain 200 of FIG. 2. The WTRU ID-specific CRC unit 206 includes a demultiplexer 302, a switch 304, a demasking unit 306, a CRC unit 308 and a controller 310. The bit sequence 205 is sent to the demultiplexer 302. As stated above, the bit sequence 205 includes a data part 303a and a CRC part 303b. The data part 303a and the CRC part 303b is demultiplexed by the demultiplexer 302 so that the CRC part 303b is sent to the demasking unit 306 and the data part 303a is sent to the CRC unit 308 and the controller 310. The demasking unit 306 performs demasking on the CRC part 303b with one of the WTRU IDs (i.e., the primary E-RNTI 208 or the secondary E-RNTI 209). The primary E-RNTI 208 or the secondary E-RNTI 209 is sent to the demasking unit 306 via the switch 304 under the control of the controller 310.

The demasked CRC part 307 is sent to the CRC unit 308. The CRC unit 308 performs a CRC with the data part 303a and the demasked CRC part 307 and sends a pass/fail signal 309 to the controller 310. If the CRC passes, the controller 310 sends the data part 303a to the MAC-e entity (not shown) or to an RLS macro combiner. If the CRC fails, the controller 310 sends a control signal 311 to the switch 304 to switch the WTRU ID so that the demasking unit 306 demasks the CRC part 303a with the other WTRU ID and a second CRC is performed by the CRC unit 308 with a demasked CRC part 307 (demasked with the other WTRU ID), and the data part 303a. If the second CRC also fails, the data part 303a may be discarded.

Since the WTRU does not know which WTRU ID was used for masking at the Node-B, the WTRU needs to check for either the primary E-RNTI 208 or the secondary E-RNTI 209. Initially, the WTRU may start with the primary E-RNTI 208. Alternatively, the WTRU may use the one with which the CRC passes in the last successful decoding of the E-AGCH 112.

Figure 4:
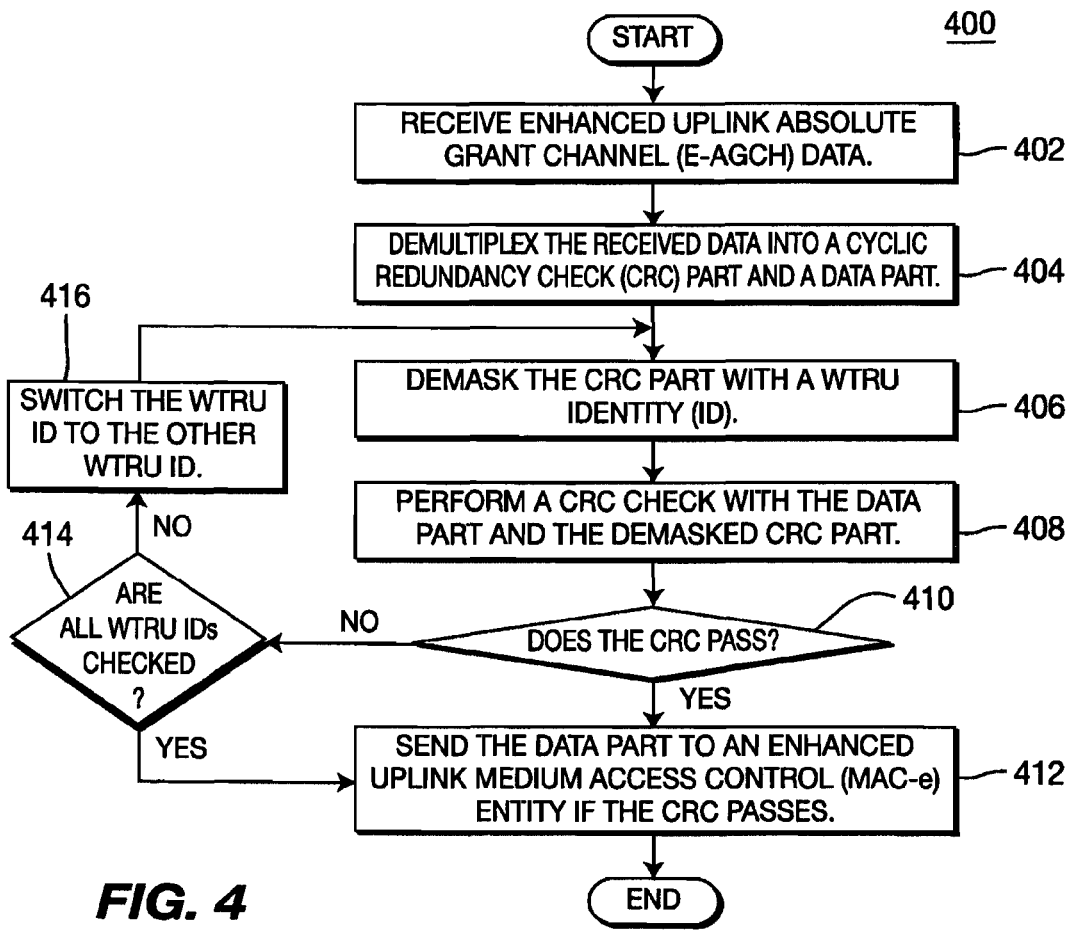
FIG. 4 is a flow diagram of a process for E-AGCH decoding in accordance with one embodiment.

FIG. 4 is a flow diagram of a process 400 for decoding an E-AGCH 112 in accordance with one embodiment. E-AGCH data is received (step 402). The received E-AGCH data is demultiplexed into a CRC part and a data part (step 404). The CRC part is demasked with a WTRU ID (step 406). A CRC is performed with the data part and the demasked CRC part (step 408). It is then determined whether the CRC passes (step 410). If the CRC passes, the data part is sent to the MAC-e entity (step 412). If the CRC fails, it is determined whether all WTRU IDs have been checked (step 414). If so, the process 400 ends. If not, the WTRU ID is switched to the other WTRU ID (step 416) and the process 400 returns to step 406.

Under the current 3GPP standards, the absolute grant information is transmitted over either one E-AGCH subframe (2 ms) or one E-AGCH frame (10 ms) depending on the E-DCH transmission time interval (TTI). When the E-DCH TTI is equal to 10 ms, the absolute grant information for the WTRU is repeated in all the E-AGCH 2 ms subframes in the same 10 ms frame such that the same sequence of E-AGCH bits (60 bits per subframe) is repeated over all the 2 ms subframes in the same 10 ms frame.

If the WTRU successfully decodes (no CRC error) the data received in an E-AGCH subframe j, then the data part is delivered to the MAC-e entity and the process stops (in order for the WTRU to avoid unnecessary processing). However, if the WTRU fails to decode the E-AGCH data for both WTRU IDs, the WTRU then has the following two options.

In accordance with the first option, the WTRU may decode E-AGCH data in each 2 ms subframe independently. An erroneous E-AGCH data in subframe j is discarded and the WTRU freshly processes the E-AGCH data received in a subframe j+1 of the same 10 ms radio frame as described hereinbefore.

In accordance with the second option, the WTRU may soft combine the E-AGCH data received in the previous 2 ms subframes and in the current 2 ms subframe of the 10 ms same radio frame. Because the same sequence of absolute grant data is transmitted over all the 2 ms subframes of the same E-AGCH frame for the 10 ms E-DCH TTI, the WTRU may perform soft combining (bit-by-bit combining before decoding) of the sequence of the E-AGCH bits received in 2 ms subframe j+1 with the sequence(s) received in the previous E-AGCH 2 ms subframe(s) of the same 10 ms radio frame, where j=1, 2, 3, 4. Optionally, weighting factors may be applied to the individual 2 ms subframes. The weighting factor may be determined as a function of a signal-to-interference ratio (SIR) of the E-AGCH in the corresponding 2 ms subframe.

Figure 5:
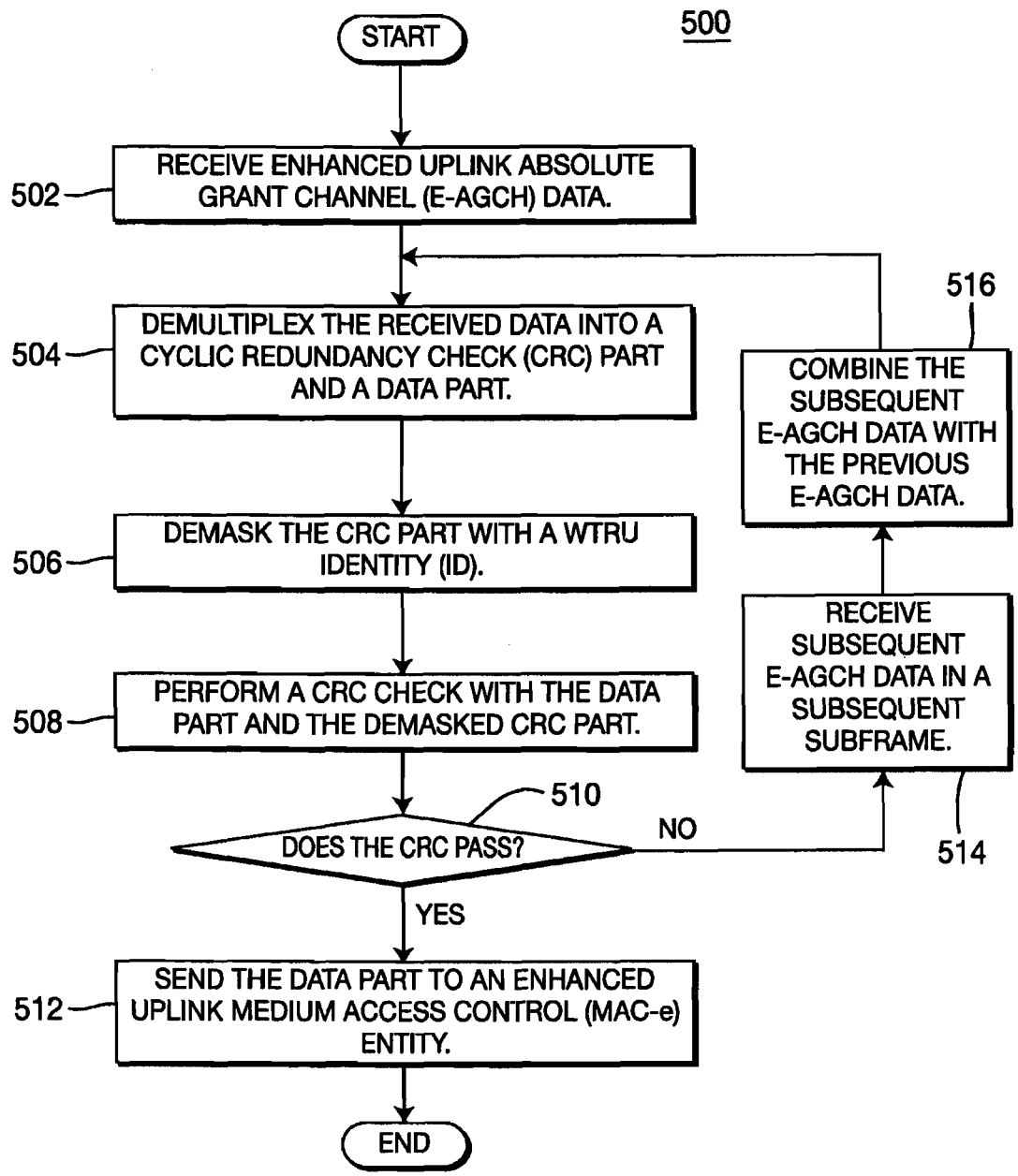
FIG. 5 is a flow diagram of a process for E-AGCH decoding in accordance with another embodiment.

FIG. 5 is a flow diagram of a process 500 for E-AGCH decoding in accordance with another embodiment. E-AGCH data is received (step 502). The received E-AGCH data is demultiplexed into a CRC part and a data part (step 504). The CRC part is demasked with a WTRU ID (step 506). A CRC is performed with the data part and the demasked CRC part (step 508). It is then determined whether the CRC passes or fails (step 510). If the CRC passes, the data part is sent to the MAC-e entity (step 512). The CRC process may be performed with two WTRU IDs so that if the CRC fails with one WTRU ID, the same process is repeated with the other WTRU ID, as explained hereinbefore. If the CRC fails with all WTRU IDs, subsequent E-AGCH data is received in a subsequent subframe (step 514). The subsequent E-AGCH data may be soft combined with the data received in the previous subframe (step 516). The process 500 then returns to step 504.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of decoding enhanced uplink absolute grant channel (E-AGCH) transmissions in a wireless transmit/receive unit (WTRU), the method comprising:
   receiving E-AGCH data, the E-AGCH data including a cyclic redundancy check (CRC) part and a data part, the CRC part having been masked with a WTRU identity (ID);
   demultiplexing the CRC part and the data part;
   demasking the CRC part with a first WTRU ID;
   performing a first CRC with the data part and the CRC part demasked with the first WTRU ID; and
   decoding the data part on a condition that the first CRC passes.

2. The method of claim 1, wherein the first WTRU ID is any one of: a primary enhanced dedicated channel (E-DCH) radio network temporary ID (E-RNTI), a secondary E-DCH E-RNTI, or a secondary E-RNTI with which a CRC passed for previous E-AGCH data.

3. The method of claim 1, wherein on a condition that the first CRC fails, the method further comprises:
   demasking the CRC part with a second WTRU ID;
   performing a second CRC with the data part and the CRC part demasked with the second WTRU ID; and
   decoding the data part on a condition that the second CRC passes.

4. The method of claim 3, wherein the second WTRU ID is any one of: a primary enhanced dedicated channel (E-DCH) radio network temporary ID (E-RNTI) or a secondary E-DCH E-RNTI.

5. The method of claim 3, wherein the E-AGCH data is transmitted in any one of: a 2 millisecond (ms) subframe or a 10 ms frame which includes five 2 ms subframes and the E-AGCH data is repeated five times for the 10 ms frame.

6. The method of claim 5, wherein on a condition that the second CRC fails, the method further comprises:
   receiving subsequent E-AGCH data in a subsequent subframe;
   combining the subsequent E-AGCH data with the E-AGCH data;
   demultiplexing a combined CRC part and a combined data part from the combined E-AGCH data;
   demasking the combined CRC part with the first WTRU ID;
   performing a third CRC with the combined data part and the combined CRC part demasked with the first WTRU ID; and
   decoding the combined data part on a condition that the third CRC passes.

7. The method of claim 6, further comprising:
   on a condition that the third CRC fails, demasking the combined CRC part with the second WTRU ID;
   performing a fourth CRC with the combined data part and the combined CRC part demasked with the second WTRU ID; and
   decoding the combined data part on a condition that the fourth CRC passes.

8. The method of claim 6, further comprising:
   multiplying the subsequent E-AGCH data by a weighting factor.

9. The method of claim 8, further comprising:
   estimating a signal-to-noise ratio (SNR) on the subsequent subframe, wherein the weighting factor is determined based on the SNR.

10. A wireless transmit/receive unit (WTRU) for decoding enhanced uplink absolute grant channel (E-AGCH) transmissions, the WTRU comprising:
    a receiver configured to receive E-AGCH data, the E-AGCH data including a data part and a cyclic redundancy check (CRC) part, the CRC part having been masked with a WTRU identity (ID);
    a demultiplexer configured to demultiplex the data part and the CRC part;
    a demasking unit configured to demask the CRC part with a WTRU ID;
    a CRC unit configured to perform a CRC on the data part with the demasked CRC part; and
    a controller configured to send the data part for decoding on a condition that the CRC passes.

11. The WTRU of claim 10, wherein the WTRU ID is any one of: a primary enhanced dedicated channel (E-DCH) radio network temporary ID (E-RNTI), a secondary E-DCH E-RNTI, or a secondary E-RNTI with which a CRC passed for previous E-AGCH data.

12. The WTRU of claim 10, wherein the E-AGCH data is transmitted in any one of: a 2 millisecond (ms) subframe or a 10 ms frame which includes five 2 ms subframes and the E-AGCH data is repeated five times for the 10 ms frame.

13. The WTRU of claim 12, wherein on a condition that the CRC fails:
    the controller is further configured to soft combine E-AGCH data from a subsequent subframe with the E-AGCH data;
    the demultiplexer is further configured to demultiplex the combined E-AGCH data into a combined data part and a combined CRC part;
    the demasking unit is further configured to demask the combined CRC part with the WTRU ID; and
    the CRC unit is further configured to perform a CRC on the combined data part with the combined demasked CRC part.

14. The WTRU of claim 13, wherein the controller is further configured to multiply the E-AGCH data on the subsequent subframe by a weighting factor.

15. The WTRU of claim 14, wherein the weighting factor is determined based on a signal-to-noise ratio (SNR) on the subsequent subframe.

* * * * *